United States Patent [19]

Hammer

[11] Patent Number: 4,489,504
[45] Date of Patent: Dec. 25, 1984

[54] STEAM GRANULATION APPARATUS AND METHOD

[75] Inventor: Karl Hammer, Lörrach, Fed. Rep. of Germany

[73] Assignee: Aeromatic AG, Switzerland

[21] Appl. No.: 345,203

[22] Filed: Feb. 3, 1982

[30] Foreign Application Priority Data

Feb. 10, 1981 [CH] Switzerland .................. 880/81

[51] Int. Cl.³ .............................. F26B 3/08
[52] U.S. Cl. ..................... 34/10; 34/57 A;
34/57 B; 432/15; 432/58
[58] Field of Search ............ 34/57 A, 10, 57 R, 57 B;
110/245; 432/15, 58; 122/4 D; 159/45

[56] References Cited

U.S. PATENT DOCUMENTS

| | | |
|---|---|---|
| 2,232,544 | 2/1941 | Lorenz . |
| 2,337,684 | 12/1943 | Scheineman . |
| 2,462,193 | 2/1949 | Hulsberg . |
| 2,578,310 | 12/1951 | Lager . |
| 2,607,662 | 8/1952 | Huff .................... 34/57 A |
| 2,607,666 | 8/1952 | Martin . |
| 2,786,742 | 3/1957 | McKinley et al. . |
| 2,797,981 | 7/1957 | Tooke . |
| 2,850,388 | 9/1958 | Peebles et al. . |
| 2,995,773 | 8/1961 | Gidlow et al. . |
| 3,152,005 | 10/1964 | Tuttle . |
| 3,231,413 | 1/1966 | Berquin . |
| 3,283,803 | 11/1966 | Phillips, Jr. et al. . |
| 3,295,221 | 1/1967 | Joy . |
| 3,631,608 | 1/1972 | Maresca et al. . |
| 3,654,705 | 4/1972 | Smith et al. . |
| 3,822,192 | 7/1974 | Brown . |
| 3,898,043 | 8/1975 | Schutte et al. . |
| 3,968,003 | 7/1976 | Wolfe . |
| 3,973,884 | 8/1976 | Terminiello . |
| 3,981,355 | 9/1976 | Squires . |
| 3,994,824 | 11/1976 | White et al. . |
| 4,023,280 | 5/1977 | Schora et al. . |
| 4,153,427 | 5/1979 | Bissett et al. . |
| 4,218,290 | 8/1980 | Phillips et al. . |
| 4,229,289 | 10/1980 | Victor ................... 34/57 A |

FOREIGN PATENT DOCUMENTS 1232057 5/1971 United Kingdom .

Primary Examiner—Larry I. Schwartz
Attorney, Agent, or Firm—Lerner, David, Littenberg, Krumholz & Mentlik

[57] ABSTRACT

A steam granulation technique involves the injection of a jet of steam into a bed of fluidized particles to be granulated. The jet of steam is substantially enveloped by a jet of air to inhibit the premature condensation of the steam onto the fluidized particles and/or the condensation of the steam onto neighboring walls of an apparatus employed to fluidize the particles, thereby inhibiting excessive wetting and lumping of the particles during their granulation.

41 Claims, 6 Drawing Figures

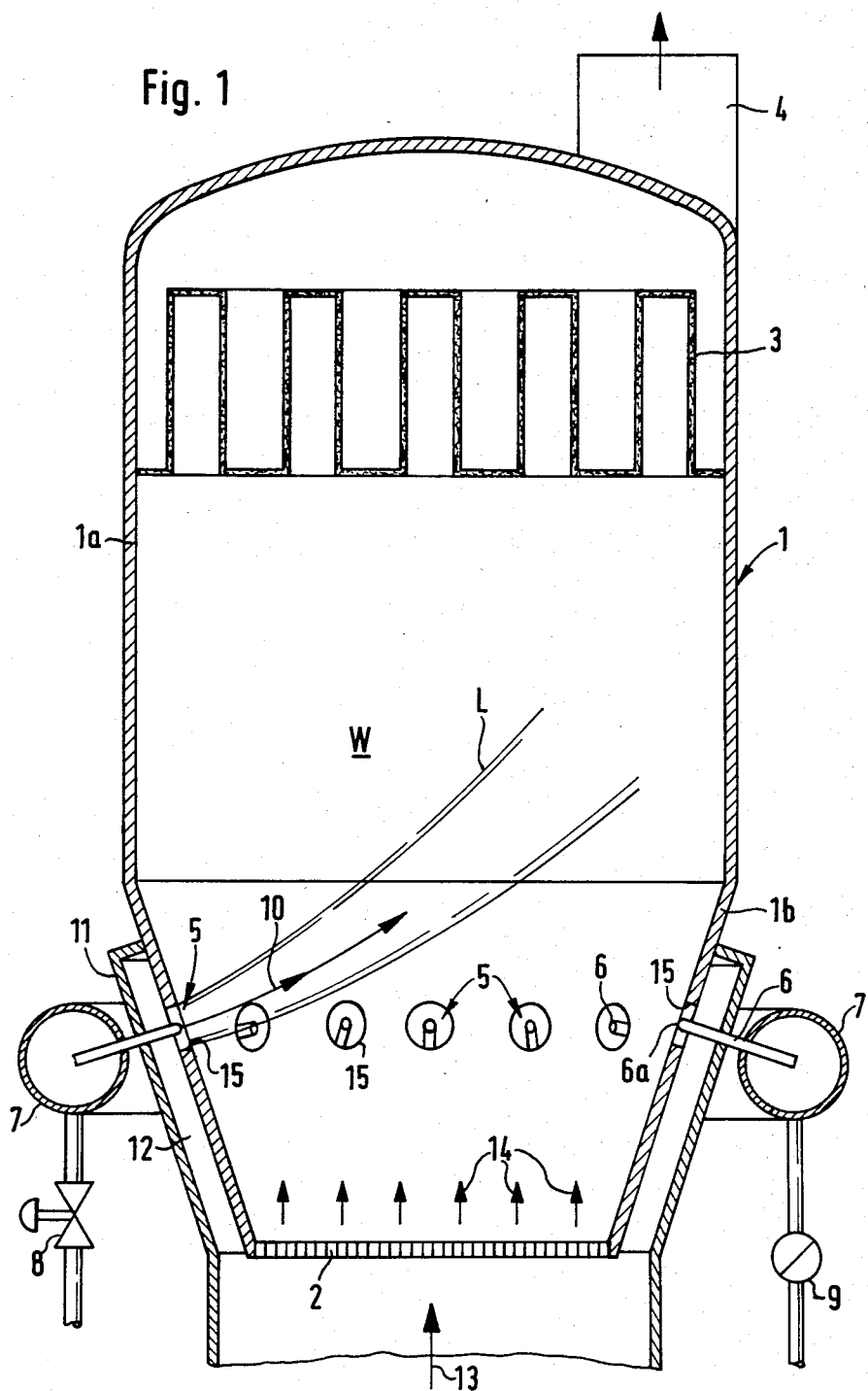

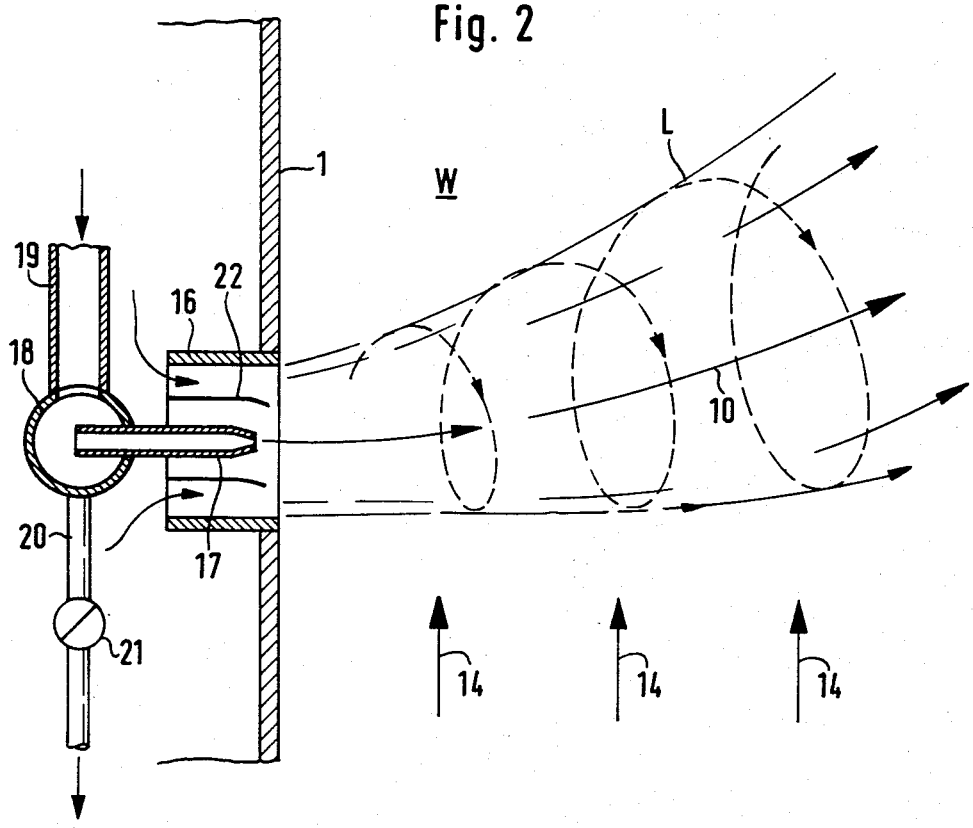
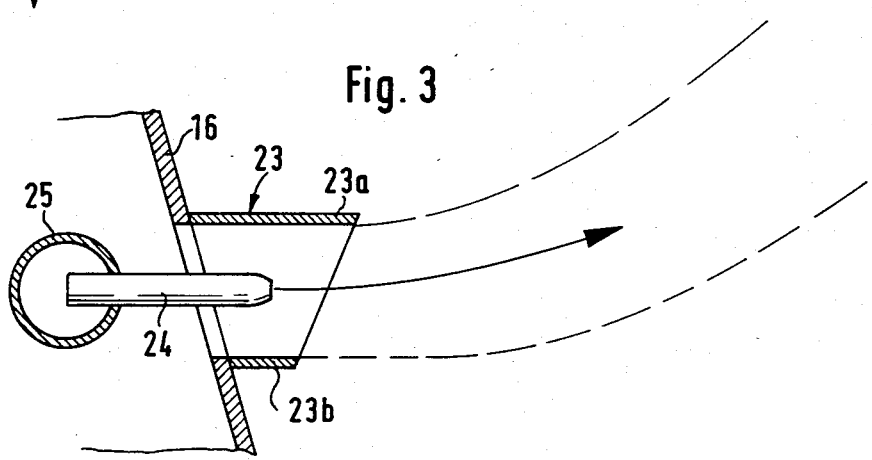

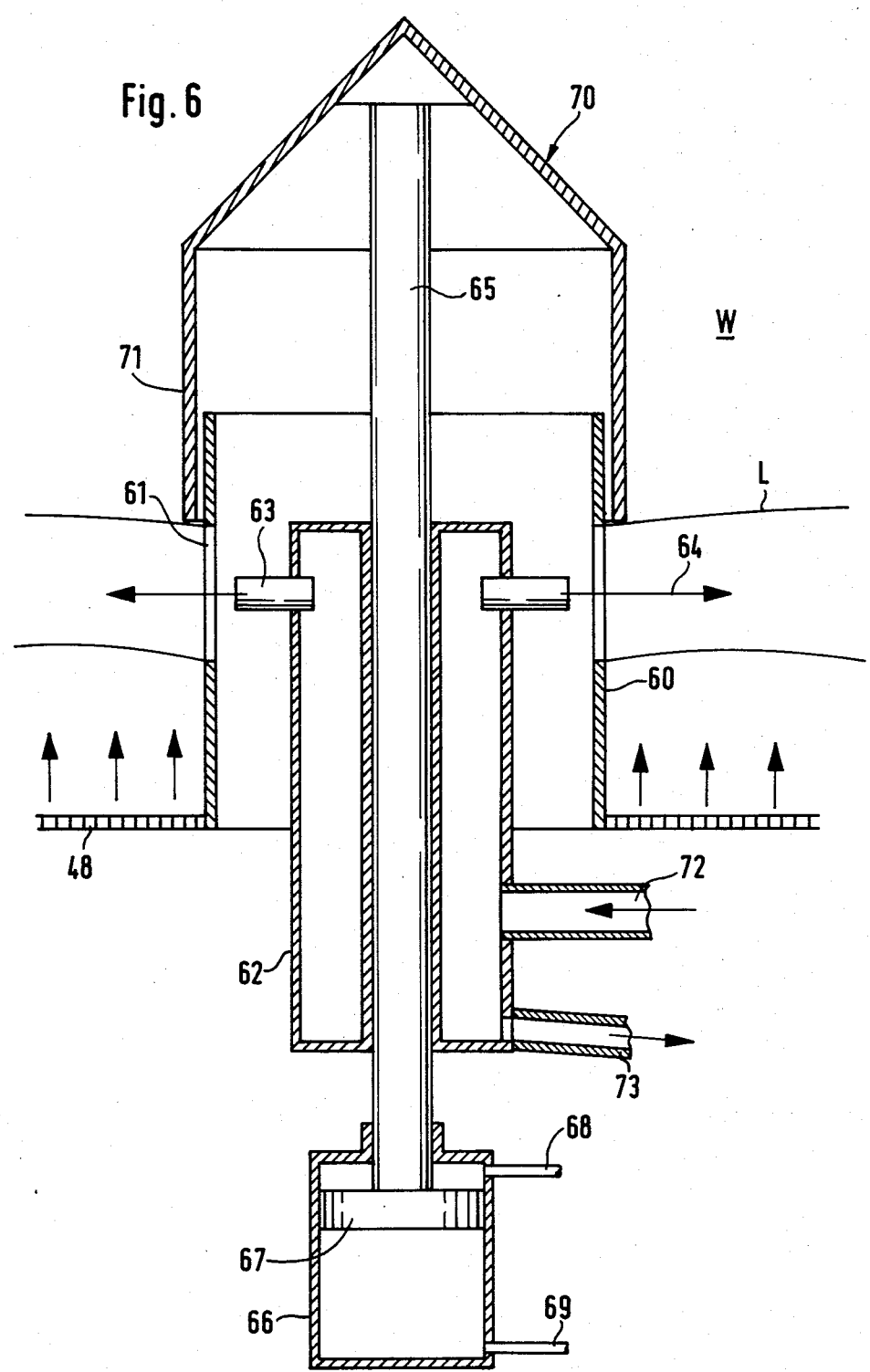

STEAM GRANULATION APPARATUS AND METHOD

FIELD OF THE INVENTION

The present invention relates to the granulation of solids, or mixtures containing solids, in a fluidized bed apparatus in which particles to be granulated are fluidized by an upward stream of air and then wetted and subsequently dried to agglomerate or granulate the particles. Such a granulation technique is especially useful in the production of "instant products", such as instant tea, coffee and milk.

BACKGROUND OF THE INVENTION

Fluidized bed techniques have been used to granulate powdery substances in the past. Normally, a bed of powder to be granulated is provided within a closed container, which has a porous bottom. Pre-heated air is injected through the bottom of the container to fluidize the bed of powder. A dust filter positioned in front of an outlet in the upper portion of the container prevents the fluidized powder from being discharged from the container through the outlet. By spraying liquid into the container while the powder is fluidized, various particles constituting the powder will stick together to form numerous larger agglomerates or granulates. This agglomeration or granulation process de-dusts the powder and makes it easier to handle. More particularly, the liquid which is sprayed into the closed container contacts the individual particles causing their surfaces to be partially dissolved, whereby the particles stick to each other to form the granulates or agglomerates. The liquid should preferably wet as much of the surface area of the particles as possible. Thus, in such fluidized bed granulating processes, the introduction and even distribution of the liquid is especially critical.

One method of wetting particles to be granulated involves spraying the particles with a mixture of water and air. A disadvantage of this method involves the relatively large amount of compressed air required to atomize the water. Also, because such atomization produces water droplets of various different sizes, it is difficult, especially in a relatively large fluidized bed apparatus, to distribute the water over all of the particles. Thus, it takes a long time to wet all of the particles when they are being granulated by a mixture of water and air.

Another common method of granulating particles involves the injection of the required amount of liquid in the form of steam. This steam injection method, which employs steam at a temperature of about 150° C., tends to produce local overheating and excessive wetting of the particles in the vicinity of the steam nozzles, thereby causing the formation of lumps in the granulated product. Also, condensation forms on the steam nozzles, causing the particles to stick to them in lumps. Furthermore, the steam jets have a very limited range. For instance, steam nozzles located deep down within the fluidized bed apparatus only have a range of a few centimeters. Steam nozzles higher in the fluidized bed apparatus tend to inject the steam jets in the direction of the filter arranged in the upper portion of the fluidized bed apparatus, thereby causing the filter to become wet and therefore impeding the flow of air through it. When the steam comes into direct contact with the housing of the fluidized bed apparatus, condensation forms on the housing. The condensation causes the particles to collect in lumps on the housing. To disintegrate the lumps, the steam and the particles can be combined and, after the steam has condensed onto the particles to partially dissolve them, the particles are flung onto a rotating baffle-plate which causes the granulation of the particles. After the granulated particles are flung away by the rotation of the baffle-plate, they are subsequently pre-dried in a flow of hot gases and then finally dried in the fluidized bed apparatus. Such a steam granulation process is very expensive and also time consuming, as well as difficult to control. In spite of the use of the rotating baffle-plate, the formation of lumps and excessive wetting are frequently encountered when using this method.

SUMMARY OF THE INVENTION

The problems and disadvantages of the granulating techniques discussed above are overcome by the present invention which involves a new and improved technique for use in connection with fluidized bed apparatus for granulating a bed of fluidized particles. More particularly, the present invention involves injecting one or more jets of steam into the fluidized bed apparatus and, hence, the bed of fluidized particles contained therein. Each jet of steam is substantially enveloped by a corresponding jet of gas, such as air, injected into the fluidized bed apparatus and, hence, the bed of fluidized particles contained therein. Each jet of gas forms a temporary jacket of gas between its corresponding jet of steam, on one hand, and the fluidized bed apparatus and the fluidized particles, on the other hand. By enveloping and jacketing each jet of steam in a jet of gas, the jet of steam is inhibited from prematurely condensing onto the particles. Such premature condensing of the steam could result in the particles collecting in lumps on the fluidized bed apparatus, as well as on any nozzles which might be employed by the fluidized bed apparatus to inject the steam. In addition to eliminating this troublesome lumping problem, the present invention achieves a quick and uniform wetting of the particles to be granulated without local excessive wetting or overheating of the particles. Thus, the present invention permits the formation of a granulated product with close particle spectrum and without lumps.

The jets of steam and gas can be injected generally transversely into the fluidized bed apparatus and, hence, the bed of fluidized particles. Alternatively, the jets of steam and gas can be injected generally axially into the fluidized bed apparatus and, hence, the bed of fluidized particles. The combined transverse and axial injection of the jets of steam and gas is also possible in accordance with the present invention.

The jets of steam and gas can be injected coaxially through concentric nozzles which communicate with the interior of the fluidized bed apparatus. By directing the nozzles downward, the fluidized particles are inhibited from entering the nozzles and thereby interfering with their proper operation. It is also possible to shield or cover the nozzles in order to inhibit the fluidized particles from entering them.

BRIEF DESCRIPTION OF THE DRAWINGS

For a better understanding of the present invention, reference may be had to the following detailed description of five exemplary embodiments considered in conjunction with the accompanying drawings, in which:

FIG. 1 is a vertical cross-sectional view of a schematically illustrated fluidized bed apparatus equipped with a first embodiment of a nozzle constructed in accordance with the present invention and adapted for use in connection with the steam granulation of a powdery substance;

FIG. 2 is an enlarged cross-sectional view of one of the nozzles employed by the fluidized bed apparatus illustrated in FIG. 1;

FIG. 3 is a cross-sectional view similar to FIG. 2 showing a second embodiment of a nozzle constructed in accordance with the present invention;

FIG. 6 is a vertical cross-sectional view similar to FIG. 3 showing a fifth embodiment of a nozzle constructed in accordance with the present invention and adapted for use in connection with the steam granulation of a powdery substance.

DESCRIPTION OF THE EXEMPLARY EMBODIMENTS

Figure 4:
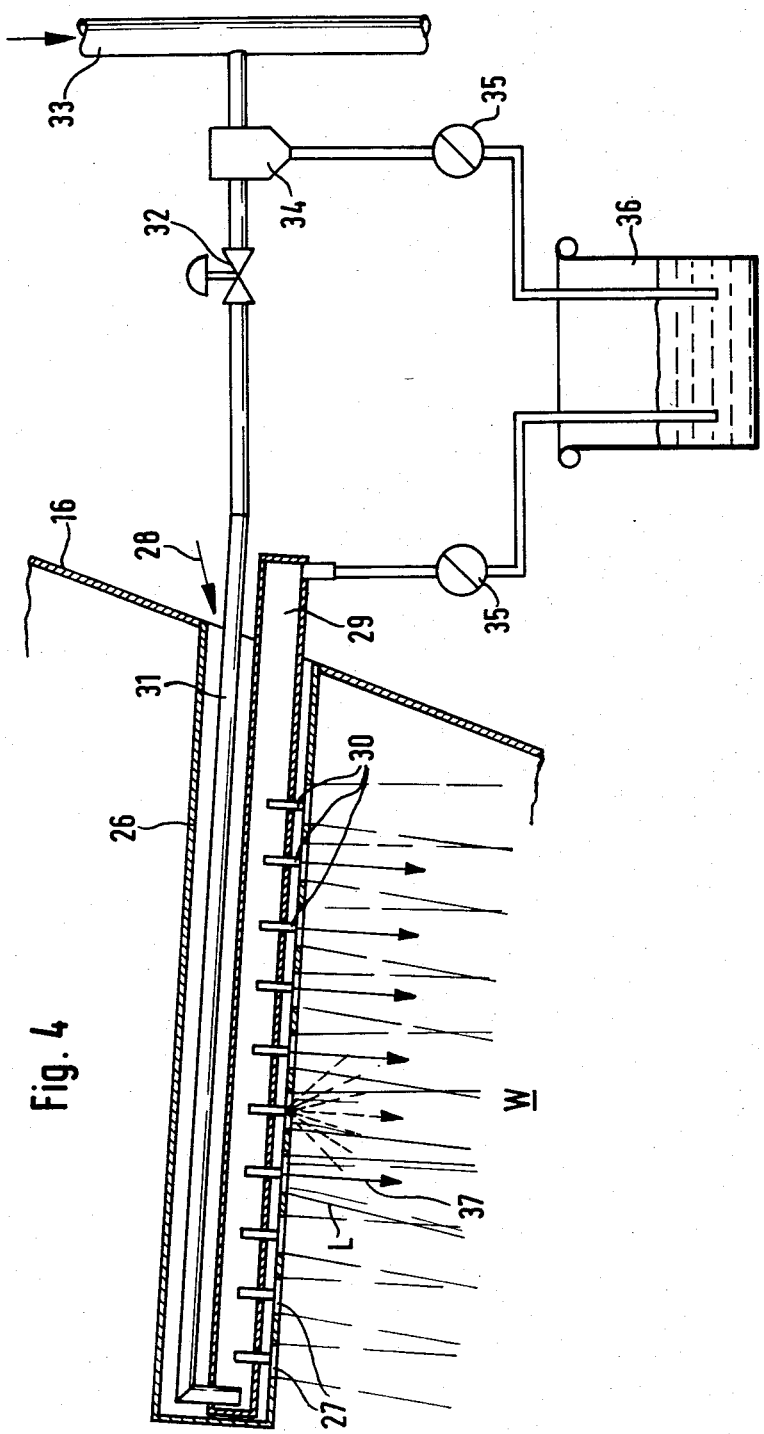
FIG. 4 is a schematic illustration of a portion of a fluidized bed apparatus equipped with a third embodiment of a nozzle constructed in a accordance with the present invention and adapted for use in the steam granulation of a powdery substance.

Referring to FIG. 1, there is shown a fluidized bed apparatus including a housing 1 which has an upper cylindrical section 1a and a lower conical section 1b. A porous floor 2 is provided in the lower section 1b of the housing 1, whereas the upper section 1a of the housing 1 houses a dust filter 3. In operation, the apparatus is filled to a certain level with a powdery substance, which is then fluidized by flowing pre-heated air through the porous floor 2. The air exits the housing 1 through an outlet 4 after passing through the filter 3. After a predetermined processing period, the batch of granulated material is discharged from the housing 1 and a new batch of powdery substance to be granulated is supplied to the housing 1. Thus, powdery substances are processed discontinuously inside the housing 1.

A number of bi-fluid nozzles 5 ring the periphery of the lower section 1b of the housing 1. Each of the nozzles 5 has an inner steam nozzle 6, which communicates with a steam supply duct 7. A regulating valve 8 is provided in a condensation drain for the steam supply duct 7. By controlling the valve 8, jets of steam can be injected into the housing 1 in a direction indicated by arrow 10 from the steam nozzles 6. The lower section 1b of the housing 1 also includes a partition 11, which forms a plenum 12 adapted to receive a portion of the air supplied to the housing 1 and flowing in a direction indicated by arrow 13. While most of the inflowing, pre-heated, compressed air enters the housing 1 in a direction indicated by arrow 14 after passing through the porous floor 2, some of the air flows into the housing 1 after passing through the plenum 12 and exiting from air outlet openings 15, which are arranged in a circular pattern in the lower section 1b of the housing 1 and adapted to function as air nozzles. Each of the air outlet openings 15 concentrically surrounds an orifice 6a formed in a corresponding one of the steam nozzles 6. Because of the concentric arrangement of the steam nozzles 6 and the air outlet openings 15, the steam jets 10 do not, at least initially, directly contact the particles comprising a bed of fluidized particles (W), but rather are surrounded by a jacket of air which ascends slightly under the influence of the upward flowing air 14. The individual jackets of air, one of which is labeled (L) in FIG. 1, cross each other and are thoroughly intermingled in the housing 1.

It is important that the steam jets 10, as soon as they leave the nozzle orifices 6a, do not come into contact with the particles to be granulated, but rather are transported into the bed of fluidized particles (W) within the air jets (L). In this way, the particles in the vicinity of the air jets (L) are accelerated and moved parallel to the air jets (L). When the air jets (L) lose speed, the particles in the vicinity of the air jets (L) mix with the air jets (L) to form a turbulent flow. Although each of the steam jets 10 is injected into the center of a corresponding one of the air jets (L), after a predetermined time, during which the steam jets 10 have penetrated the bed of fluidized particles (W) a predetermined distance, the steam jets 10, which are preferably made from slightly overheated steam, mix with the air jets (L) and therefore cool down.

The steam and air mixture produced by the nozzles 5 is distributed evenly over a large area of the bed of fluidized particles (W) and condenses upon contact with the cooler fluidized particles, whereby the particles are sufficiently melted to achieve granulation and agglomeration. Because the steam is carried upwardly within the housing 1 along with the air jets (L), the particles to be granulated are blown away from the nozzle orifices 6a, whereby the steam is distributed over a large surface area of the particles. Thus, local excessive wetting of the particles and the formation of lumps are effectively eliminated.

Although the steam nozzles 6 are arranged at an inclined angle, they can be arranged horizontally or at any other desired angle. By extending the steam nozzles 6 far into the steam supply duct 7, condensation collected inside the steam supply duct 7 will not be carried into the housing 1 along with the steam.

Other exemplary embodiments of the present invention are illustrated in FIGS. 2-6. The various elements illustrated in FIGS. 2-6 which correspond to elements described above with respect to FIG. 1 have been designated by corresponding reference numerals.

FIG. 2 shows an alternate embodiment of the bi-fluid nozzles 5 illustrated in FIG. 2. With particular reference to FIG. 2, a tubular air inlet pipe 16 is secured to an upper section 1a of a housing 1. A steam nozzle 17 is arranged coaxially within the air inlet pipe 16. The steam nozzle 17 communicates with a header 18, which is supplied with steam through a steam duct 19. The condensation collected in the header 18 is drained of by an outlet duct 20 and a condensation removal device 21.

The air inlet pipe 16 functions as an outer nozzle through which air is supplied to the interior of the housing 1 and, hence, to a bed of fluidized particles (W). Vanes 22 are provided in the air inlet pipe 16 to cause an air jet (L) produced by the air inlet pipe 16 to spiral as it is injected into the housing 1. A jet of steam 10, which is discharged from the steam nozzle 17, ascends slightly along with the air jet (L) under the influence of upwardly flowing air 14. Because the steam jet 10 is substantially enveloped by the spiralling air jet (L), this embodiment offers the same advantages as the embodiment of FIG. 1, as well as additional advantages.

As shown in FIG. 3, an inlet pipe 23 is secured to a lower section 1b of a housing 1. The air inlet pipe 23 has a lower surface 23b and an upper surface 23a, which extends into the interior of the housing 1 farther than the lower surface 23b. A steam nozzle 24 is situated concentrically in the air inlet pipe 23. Because the air inlet pipe 23 extends into the interior chamber of the housing 1 farther than the steam nozzle 24, particles fluidized in the housing 1 are inhibited from falling into the steam nozzle 24, which is supplied with steam through a supply conduit 25.

In FIG. 4, a jacketed pipe 26 projects radially into the interior of a housing 1 from a lower conical section 1b. Several air outlet openings 27 are provided on the bottom of the jacketed pipe 26, which is open to the atmosphere so that air can enter in a direction indicated by arrow 28.

Inside the jacketed pipe 26, there is a steam duct 29, which has a number of steam nozzles 30 extending downwardly therefrom. The steam nozzles 30 extend concentrically into the air outlet openings 27 of the jacketed pipe 26. Steam is supplied to the steam duct 29 by an inlet pipe 31, which is connected to a steam pipeline 33. A valve 32 regulates the flow of steam from the pipeline 33 to the inlet pipe 31. A pair of condensation separators 35 and a drain 34 are also provided so that collected condensation can be drained off to a pressureless water container 36.

Each of the steam nozzles 30 produces a steam jet 37 which is surrounded or enveloped by an air jet (L), which inhibits the premature condensation or cooling of the steam. After the air jets (L) travel into the interior of the housing 1 a predetermined distance, adjacent air jets (L) intermingle to form turbulence, resulting in the particles being wetted over a relatively large surface area thereof.

Figure 5:
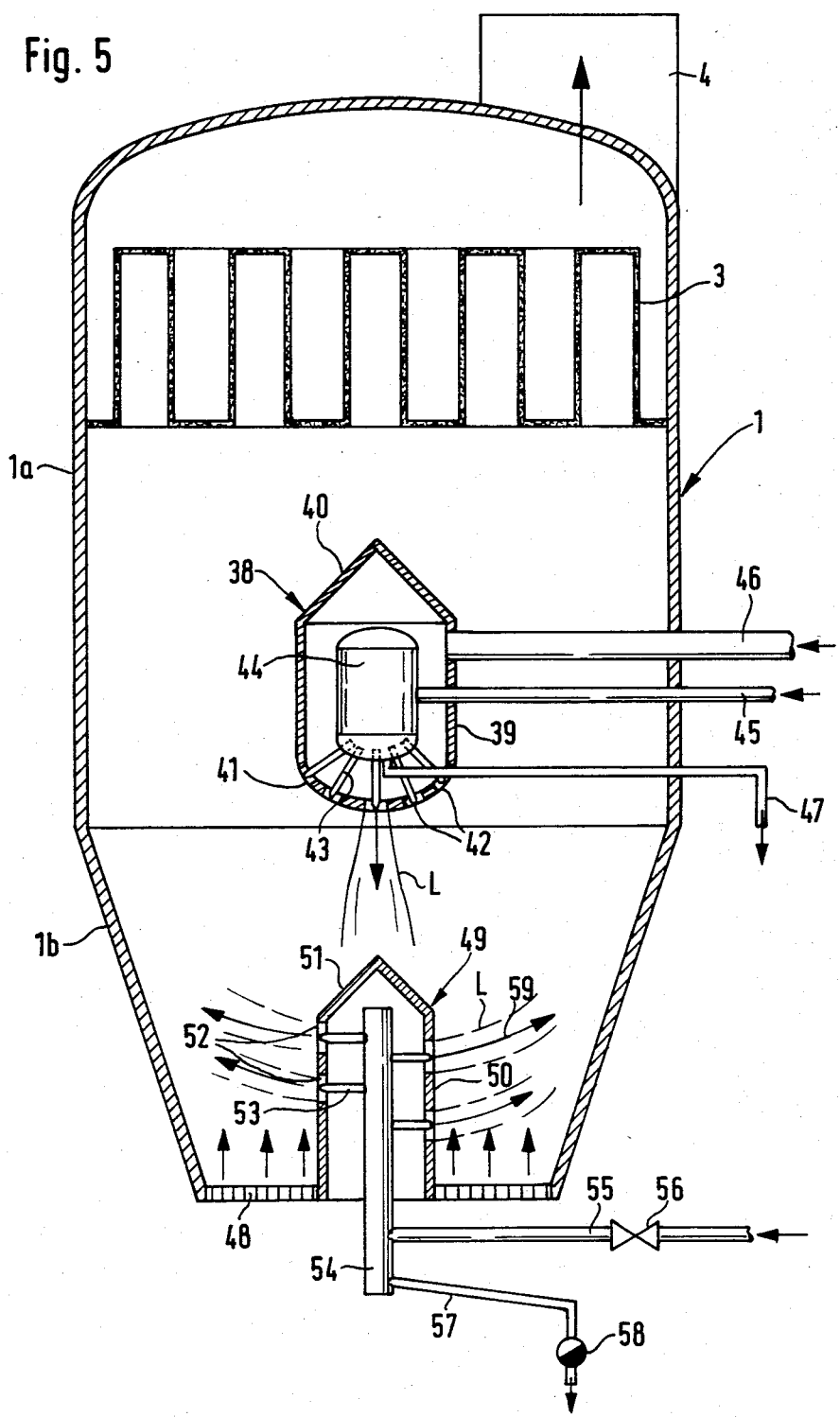
FIG. 5 is a vertical cross-sectional view of a schematically illustrated fluidized bed apparatus equipped with a fourth embodiment of a nozzle constructed in accordance with the present invention and adapted for use in connection with the steam granulation of a powdery substance.

In FIG. 5, a steam distributor 38 is arranged in the center of a housing 1. The distributor 38 has a casing 39, including a conical top 40 and a round base 41, which is provided with a number of air outlet openings 42. A row of steam nozzles 43 project coaxially into the air outlet openings 42. Steam is fed to the steam nozzles 43 from a central steam chamber 44, which is supplied with steam through a pipeline 45. The space between the steam chamber 44 and the casing 39 communicates with the atmosphere or with a source of compressed air through a pipeline 46. A condensation drain 47 communicates with the steam chamber 44. Because the air outlet openings 42 and the steam nozzles 43 are directed generally downward, particles fluidized in the housing 1 are inhibited from falling into the air outlet openings 42 and the steam nozzles 43.

Another steam distributor 49 is installed on a floor 48 of the housing 1. A pipe 50 projects upwardly from the middle of the floor 48. The pipe 50 has a conical top 51 and a row of air outlets 52 arranged in a circumferential surface of the pipe 50. Steam nozzles 53 project coaxially into the air outlets 52. The steam nozzles 53 are supplied with steam by a supply pipe 54, which is fed by a steam pipeline 55 equipped with a regulating valve 56. In the bottom of the steam pipe 54, there is a condensation drain 57 having a condensation separator 58 provided therein. Steam jets 59, which are discharged in a radial direction from the steam nozzles 53, exit the distributor 49 enveloped by air jets (L) produced by the air outlets 52, which function as nozzles.

FIG. 6 shows an alternate embodiment of the steam distributor 48 illustrated in FIG. 5. With particular reference to FIG. 6, a pipe 60 projects upwardly from a porous floor 48 of a fluidized bed apparatus. Several equally spaced air outlets 51 are provided in the pipe 60, the air outlets 61 being arranged in a circular pattern. A steam pipe 62 projects upwardly into the pipe 60 with steam nozzles 63 projecting radially outwardly from the steam pipe 62, which is supplied with steam by a pipeline 72 and is drained of condensation by a drain 73. Each of the steam nozzles 63 is arranged concentrically with respect to a corresponding one of the air outlets 61. The steam nozzles 63 cooperate with the air outlets 61 to form steam jets 64, each of which is enveloped by an air jet (L) during its injection into a bed of fluidized particles (W). A piston rod 65 is slideably received in the steam pipe 62. A piston 67, which is slideably received in a cylinder 66, is fixedly attached to the bottom of the piston rod 65. The cylinder 66 is equipped with a pair of compressed air connection 68, 69. A hood 70, which is secured to the top of the piston rod 65, can be moved up and down by controlling the movement of the piston 67 within the cylinder 66. The hood 70 has a depending cylindrical skirt 71 which, when the hood 70 is lowered by the piston and cylinder assembly, covers the air outlets 61, thereby inhibiting particles which are being granulated from falling into the air outlets 61.

In the operation of all of the embodiments illustrated in FIGS. 1-6, the air jets (L) serve four important functions. First, they act as carriers for the steam jets. Second, the facilitate the drying of the particles that are being granulated. Third, they facilitate the uniform distribution of the steam within and throughout the bed of fluidized particles during the granulation process. Fourth, they form a protective jacket which allows the steam to penetrate a predetermined distance into the bed of fluidized particles before actually contacting the individual particles, thereby inhibiting the steam from prematurely condensing onto the particles or from condensing at all onto the cool housing wall. As described above, the air required to create the air jets (L) can be taken from the atmosphere by allowing fresh air to be drawn into the fluidized bed apparatus as a result of the vacuum prevailing therein. Alternatively, the air can be supplied by a source of compressed air. It is also possible to use the air which is exhausted from the fluidized bed apparatus to create the air jets.

It will be understood that the embodiments described herein are merely exemplary and that a person skilled in the art may make many variations and modifications without departing from the spirit and scope of the invention. For instance, it is possible to equip the air inlet conduits with rapidly closing valves so that the incoming air flow can be throttled to regulate the speed of the air jets and therefore vary the quality of the granulated product. Also, the present invention is adaptable for use in connection with any previously known fluidized bed spray granulator, whereby auxiliary granulating agents could possibly be added. All such modifications and variations are intended to be included within the scope of the invention as defined in the appended claims.

I claim:

1. A method of granulating a bed of fluidized particles, comprising the steps of injecting a jet of steam into the bed of fluidized particles and injecting a jet of a gas other than steam into the bed of fluidized particles such that said jet of gas substantially envelops said jet of steam until said jet of steam penetrates the bed of fluidized particles a predetermined distance, whereby said jet of gas forms a temporary jacket of gas between the fluidized particles and said jet of steam to thereby inhibit said jet of steam from condensing onto the particles until said jet of steam penetrates the bed of fluidized particles said predetermined distance, at which point said jet of steam condenses onto the particles to facilitate their granulation without excessive local wetting and overheating.

2. A method according to claim 1, wherein said jet of gas facilitates the drying of the particles that are being granulated.

3. A method according to claim 1, wherein said jet of gas facilitates the uniform distribution of the steam within and throughout the bed of fluidized particles.

4. A method according to claim 1, wherein said jets of steam and gas are injected coaxially to each other.

5. A method according to claim 1, wherein said jet of gas spirals during its injection into the bed of fluidized particles.

6. A method according to claim 1, wherein said jets of steam and gas are injected generally transversely into the bed of fluidized particles.

7. A method according to claim 6, wherein said jets of steam and gas are injected generally upwardly into the bed of fluidized particles.

8. A method according to claim 1 or 6, wherein said jets of steam and gas are injected generally downwardly into the bed of fluidized particles.

9. A method according to claim 1, wherein said jets of steam and gas are injected generally axially into the bed of fluidized particles.

10. A method according to claim 1 or 9, wherein said jets of steam and gas are injected generally downwardly into the bed of fluidized particles.

11. A method according to claim 1, wherein a fluid employed to fluidize the bed of fluidized particles is also used to form said jet of gas.

12. A method according to claim 1 or 11, wherein said jet of gas is pre-heated.

13. A method according to claim 12, wherein said fluid is employed to form said jet of gas after it has been used to fluidize the bed of fluidized particles.

14. A method according to claim 1, wherein said jets of steam and gas are injected generally linearly into the bed of fluidized particles.

15. A method according to claim 1, wherein said jets of steam and gas are injected generally arcuately into the bed of fluidized particles.

16. A method according to claim 1, wherein said jet of gas is formed from air at atmospheric pressure which is drawn into the bed of fluidized particles by suction created from the fluid employed to fluidize the bed of fluidized particles.

17. A method according to claim 1, wherein said jet of gas is formed from pressurized air injected into the bed of fluidized particles from a source of compressed air.

18. A method according to claim 1, further comprising the steps of injecting a plurality of additional jets of steam into the bed of fluidized particles and injecting a plurality of additional jets of gas into the bed of fluidized particles such that each of said additional jets of gas substantially envelops a corresponding one of the said additional jets of steam, whereby said additional jets of gas form a temporary jacket of gas between the fluidized particles and said additional jets of steam to thereby inhibit said additional jets of steam from prematurely condensing onto the particles.

19. A method according to claim 17, wherein said jet of gas intermingles with at least one of said additional jets of gas.

20. A method according to claim 18, wherein some of said additional jets of steam and gas are injected generally transversely into said the bed of fluidized particles and other of said additional jets of steam and gas are injected generally axially into the bed of fluidized particles.

21. Fluidized bed apparatus having an interior chamber in which a bed of particles may be fluidized, comprising first injecting means for injecting a jet of steam into the interior chamber of the fluidized bed apparatus and second injecting means for injecting a jet of gas into the interior chamber of the fluidized bed apparatus such that said jet of gas substantially envelops said jet of steam until said jet of steam penetrates a bed of fluidized particles within the interior chamber a predetermined distance, whereby said jet of gas forms a temporary jacket of gas between said jet of steam and the fluidized particles to thereby inhibit said jet of steam from condensing onto the particles until said jet of steam penetrates the bed of fluidized particles said predetermined distance, at which point said jet of steam condenses onto the particles to facilitate their granulation without excessive local wetting and heating.

22. Fluidized bed apparatus according to claim 21, wherein said jet of gas facilitates the drying of the particles that are being granulated.

23. Fluidized bed apparatus according to claim 21, wherein said jet of gas facilitates the uniform distribution of the steam within and throughout the bed of fluidized particles.

24. Fluidized bed apparatus according to claim 21, wherein said temporary jacket of gas also inhibits said jet of steam from condensing onto the fluidized bed apparatus.

25. Fluidized bed apparatus according to claim 21, wherein said first injecting means includes a plurality of inner nozzles attached to the fluidized bed apparatus in a generally circular pattern and directed generally radially inwardly into the interior chamber of the fluidized bed apparatus and said second injecting means includes a plurality of outer nozzles attached to said fluidized bed apparatus in a generally circular pattern and directed generally radially inwardly into the interior chamber of the fluidized bed apparatus, each of said outer nozzles being arranged concentrically about a corresponding one of said inner nozzles, whereby each jet of steam injected into the interior chamber of the fluidized bed apparatus from one of said inner nozzles is substantially enveloped by a jet of gas injected into the interior chamber of the fluidized bed apparatus from a corresponding one of said outer nozzles.

26. Fluidized bed apparatus according to claim 25, further comprising means for connecting said outer nozzles to a source of fluid for fluidizing particles to be granulated in the interior chamber of the fluidized bed apparatus, whereby the fluid employed to fluidize the bed of particles in the interior chamber of the fluidized bed apparatus is also used to form said jets of gas.

27. Fluidized bed apparatus according to claim 25, further comprising connecting means for connecting said outer nozzles to the atmosphere, whereby each of said jets of gas is formed from air at atmospheric pressure.

28. Fluidized bed apparatus according to claim 25, wherein said inner and outer nozzles are directed generally upward.

29. Fluidized bed apparatus according to claim 25, wherein said inner and outer nozzles protrude into the interior chamber of the fluidized bed apparatus, said outer nozzles protruding farther than said inner nozzles.

30. Fluidized bed apparatus according to claim 21, further comprising swirling means for swirling said jet of gas as it is injected into the interior chamber of the fluidized bed apparatus.

31. Fluidized bed apparatus according to claim 21, wherein said first injecting means includes a steam supply conduit extending radially into the interior chamber of the fluidized bed apparatus and a plurality of inner nozzles arranged along said steam supply conduit and said second injecting means includes a gas supply conduit surrounding said steam supply conduit and extending radially into the interior chamber of the fluidized bed apparatus and a plurality of outer nozzles arranged along said gas supply, each of said outer nozzles being arranged concentrically about a corresponding one of said inner nozzles, whereby each jet of steam injected into the interior chamber of the fluidized bed apparatus from one of said inner nozzles is substantially enveloped by a jet of gas injected into the interior chamber of the fluidized bed apparatus from a corresponding one of said outer nozzles.

32. Fluidized bed apparatus according to claim 31, wherein said inner and outer nozzles are directed generally downwardly into the interior chamber of the fluidized bed apparatus.

33. Fluidized bed apparatus according to claim 21, wherein said first injecting means includes a first group of inner nozzles located centrally within the interior chamber of the fluidized bed apparatus and said second injecting means includes a first group of outer nozzles located centrally within the interior chamber of the fluidized bed apparatus, each outer nozzle of said first group of outer nozzles being arranged concentrically about a corresponding one of said inner nozzles of said first group of inner nozzles, whereby each jet of steam injected into the interior chamber of the fluidized apparatus from one of said inner nozzles of said first group of inner nozzles is substantially enveloped by a jet of gas injected into the interior chamber of the fluidized bed apparatus from a corresponding one of said outer nozzles of said first group of outer nozzles.

34. Fluidized bed apparatus according to claim 33, wherein said inner nozzles of said first group of inner nozzles and said outer nozzles of said first group of outer nozzles are directed generally downward.

35. Fluidized bed apparatus according to claim 28 or 34, wherein said first injecting means includes a second group of inner nozzles located below said first group of said inner nozzles within the interior chamber of the fluidized bed apparatus and said second injecting means includes a second group of outer nozzles located below said first group of outer nozzles within the interior chamber of the fluidized bed apparatus, each outer nozzle of said second group of outer nozzles being arranged concentrically about a corresponding one of said inner nozzles of said second group of inner nozzles, whereby each jet of steam injected into the interior chamber of the fluidized bed apparatus from one of said inner nozzles of said second group of inner nozzles is substantially enveloped by a jet of gas injected into the interior chamber of the fluidized bed apparatus from a corresponding one of said outer nozzles of said second group of outer nozzles.

36. Fluidized bed apparatus according to claim 35, wherein said inner nozzles of said second group of inner nozzles and said outer nozzles of said second group of outer nozzles are directed generally radially outward.

37. Fluidized bed apparatus according to claim 35, further comprising mounting means for mounting said inner nozzles of said second group of inner nozzles and said outer nozzles of said second group of outer nozzles within the interior chamber of the fluidized bed apparatus, said mounting means including a porous plate which forms a floor for the fluidized bed apparatus.

38. Fluidized bed apparatus according to claim 33, further comprising suspending means for suspending said inner nozzles of said first group of inner nozzles and said outer nozzles of said first group of outer nozzles within the interior chamber of the fluidized bed apparatus, said suspending means including a steam supply conduit connected to said first group of inner nozzles and an air supply conduit connected to said first group of outer nozzles.

39. Fluidized bed apparatus according to claim 21, wherein said first injecting means includes a steam supply conduit extending axially and upwardly into the interior chamber of fluidized bed apparatus and a plurality of inner nozzles formed in said steam supply conduit and said second injecting means includes a gas supply conduit surrounding said steam supply conduit and extending axially and upwardly into the interior chamber of the fluidized bed apparatus and a plurality of outer nozzles formed in said gas supply conduit, each of said outer nozzles being arranged concentrically about a corresponding one of said inner nozzles, whereby each jet of steam injected into the interior chamber of the fluidized bed apparatus from one of said inner nozzles is substantially enveloped by a jet of gas injected into the interior chamber of the fluidized bed apparatus by a corresponding one of said outer nozzles.

40. Fluidized bed apparatus according to claim 39, further comprising covering means for selectively covering and uncovering said outer nozzles.

41. Fluidized bed apparatus according to claim 40, wherein said covering means includes a hood mounted for reciprocating movement on said gas supply conduit between a first position in which said hood covers said outer nozzle and a second position in which said hood uncovers said outer nozzle and moving means for reciprocally moving said hood between said first and second positions.

* * * * *